(12) United States Patent
Urahama

(10) Patent No.: US 7,137,036 B2
(45) Date of Patent: Nov. 14, 2006

(54) MICROCONTROLLER HAVING AN ERROR DETECTOR DETECTING ERRORS IN ITSELF AS WELL

(75) Inventor: Masakazu Urahama, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 510 days.

(21) Appl. No.: 10/259,772

(22) Filed: Sep. 30, 2002

(65) Prior Publication Data

US 2003/0163766 A1 Aug. 28, 2003

(30) Foreign Application Priority Data

Feb. 22, 2002 (JP) ............... 2002-046748

(51) Int. Cl.
*G06F 11/00* (2006.01)
*G06F 11/22* (2006.01)

(52) U.S. Cl. ............... 714/36; 714/27; 714/55
(58) Field of Classification Search ........ 714/20, 714/36, 23, 55, 27, 737; 713/502; 702/118, 702/119, 120
See application file for complete search history.

(56) References Cited

U.S. PATENT DOCUMENTS

| 4,598,355 A | * | 7/1986 | Shepler et al. ............. 700/79 |
| 4,698,748 A | * | 10/1987 | Juzswik et al. ............. 713/322 |
| 4,956,842 A | * | 9/1990 | Said ............... 714/815 |
| 5,454,113 A | * | 9/1995 | Graf et al. ............. 714/23 |
| 5,983,345 A | * | 11/1999 | Mueller-Roemer ............. 713/1 |
| 6,076,172 A | * | 6/2000 | Kimura et al. ............. 714/24 |
| 6,188,256 B1 | * | 2/2001 | Birns et al. ............. 327/142 |

FOREIGN PATENT DOCUMENTS

| JP | 61023202 | 1/1986 |
| JP | 62152048 | 7/1987 |
| JP | 3095636 | 4/1991 |
| JP | 4162150 | 6/1992 |
| JP | 4283840 | 10/1992 |
| JP | 5250222 | 9/1993 |
| JP | 5289779 | 11/1993 |
| JP | 6-81039 | 11/1994 |
| JP | 2002-259163 | 9/2002 |

* cited by examiner

*Primary Examiner*—Scott Baderman
*Assistant Examiner*—Joseph Schell
(74) *Attorney, Agent, or Firm*—Rabin & Berdo P.C.

(57) ABSTRACT

A microcontroller including a CPU (Central Processor Unit) is capable of detecting the error of its structural part. The CPU executes a first initialization phase in response to a power-on reset signal output from a power-on reset circuit, then executes a second initialization phase in response to a start signal, and then executes usual processing. The CPU outputs a single timer run signal during first initialization phase and repeatedly outputs the timer run signals during usual processing. A watchdog timer starts timing in response to the timer run signal and then outputs an overflow signal on the elapse of a preselected period of time. After receiving the power-on reset signal from the power-on reset circuit, an error detector feeds the CPU with the start signal in response to an overflow signal output from the watchdog timer for the first time.

12 Claims, 5 Drawing Sheets

MICROCONTROLLER HAVING AN ERROR DETECTOR DETECTING ERRORS IN ITSELF AS WELL

BACKGROUND OF THE INVENTION

1. Field of the Invention

The present invention relates to a microcontroller and a method of detecting errors thereof. The present invention is applicable to, e.g., a microcontroller having a function of detecting the error of a CPU (Central Processor Unit) or similar structural part included therein.

2. Description of the Background Art

A microcontroller including a CPU can accurately operate so long as the CPU executes program sequences in an expected manner. When an error occurs in the CPU, the CPU goes out of control, or crashes, in executing program sequences to cause the microcontroller to malfunction. Therefore, in order to protect the microcontroller from malfunction ascribable to the crash of the CPU for thereby enhancing the reliability of the microcontroller, an error detecting circuit configured to detect the crash of the CPU and errors in other structural parts is essential for the microcontroller.

FIG. 1 shows a specific conventional microcontroller including an error detecting circuit. The microcontroller, generally 20, includes a CPU 21, a power-on reset circuit 22, a watchdog timer 23, an error detector circuit 24, and an OR gate 25 interconnected as illustrated. At the time of power-up, the CPU 21 is reset, or initialized, in response to a power-on reset signal output from the power-on reset circuit 22 and an overflow signal output from the watchdog timer 23.

The CPU 21 thus initialized delivers a timer start signal having a preselected period to the watchdog timer 23. The watchdog timer 23 monitors the timer start signal to see if the timer start signal has the preselected period and a preselected pulse width and if the signal stopping is accurately processed. Thereafter, the CPU 21 executes certain program sequences as usual. When an error or malfunction occurs in the CPU 21, the watchdog timer 23 delivers an overflow signal to the error detector 24. In response, the error detector 24 determines the error in the CPU 21 and sends out a stop signal to the CPU 21 for thereby stopping the operation of the CPU 21, or otherwise the CPU 21 would be out of control.

However, should the watchdog timer 23 involve an error and be fixed to prevent the overflow signal from being output, the crash or out-of-control state of the CPU 21 would continue. In order to avoid such a case, the CPU 21 is adapted to stop sending out the timer start signal to thereby cause the watchdog timer 23 to output the overflow signal and the error detector 24 to diagnose the watchdog timer 23. At the same time, the error detector 24 receives the power-on reset signal from the power-on reset circuit 22 and diagnoses the reset circuit 22. In this manner, the error detector 24 detects errors in the watchdog timer 23 and the power-on reset circuit 22 to determine an error in the CPU 21 or similar structural part of the microcontroller.

The problem with the conventional microcontroller 20 is that the error detector 24 cannot detect an error occurring in itself although it can detect errors of the power-on reset circuit 22 and watchdog timer 23. More specifically, when an error occurs in the error detector 24 and the power-on reset circuit 22 and watchdog timer 23 deliver signals representative of their errors to the error detector 24, the error detector 24 cannot cease the operation of the CPU 21. There would be a possibility that the CPU 21 goes out of control and causes a critical error to occur in the microcontroller system.

SUMMARY OF THE INVENTION

It is an object of the present invention to provide a microcontroller capable of detecting the error of an error detector circuit for thereby enhancing the reliability of a system using the microcontroller, and a method of detecting the error of a microcontroller.

A microcontroller in accordance with the present invention including a CPU is capable of detecting the error of its structural part. The CPU executes a first initialization phase in response to a power-on reset signal output from a power-on reset circuit, then executes a second initialization phase in response to a start signal, and then executes usual processing. The CPU outputs a single timer start signal during the first initialization phase and repeatedly outputs the timer start signal during usual processing. A watchdog timer starts timing in response to the timer start signal and then outputs an overflow signal on the elapse of a preselected period of time. After receiving the power-on reset signal from the power-on reset circuit, an error detector feeds the CPU with the start signal in response to an overflow signal output from the watchdog timer for the first time.

Also in accordance with the present invention, a method of detecting the error of structural part included in a microcontroller including a CPU comprises the steps of powering on the microcontroller; generating a power-on reset signal; executing in the CPU a first initialization phase in response to the power-on reset signal; generating a single timer start signal by the CPU; starting timing in response to the single timer start signal; generating a first overflow signal upon a preselected period of time elapsing from starting the timing; feeding the CPU with a start signal in response to the first overflow signal; executing in the CPU a second initialization phase in response to the start signal; and executing usual processing in the CPU.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
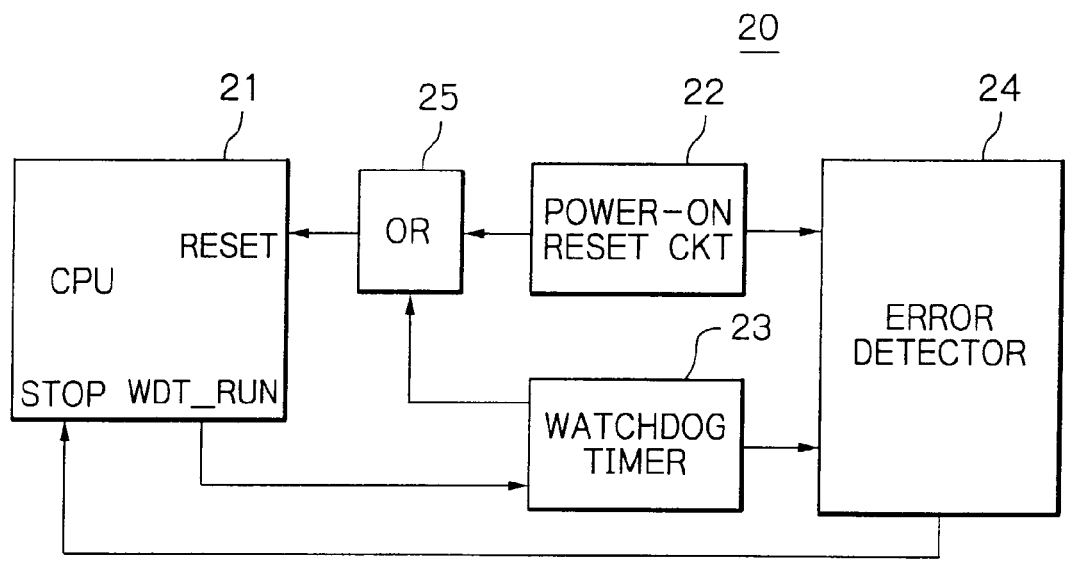
FIG. 1 is a schematic block diagram showing a specific conventional microcontroller including an error detector circuit.
Figure 2:
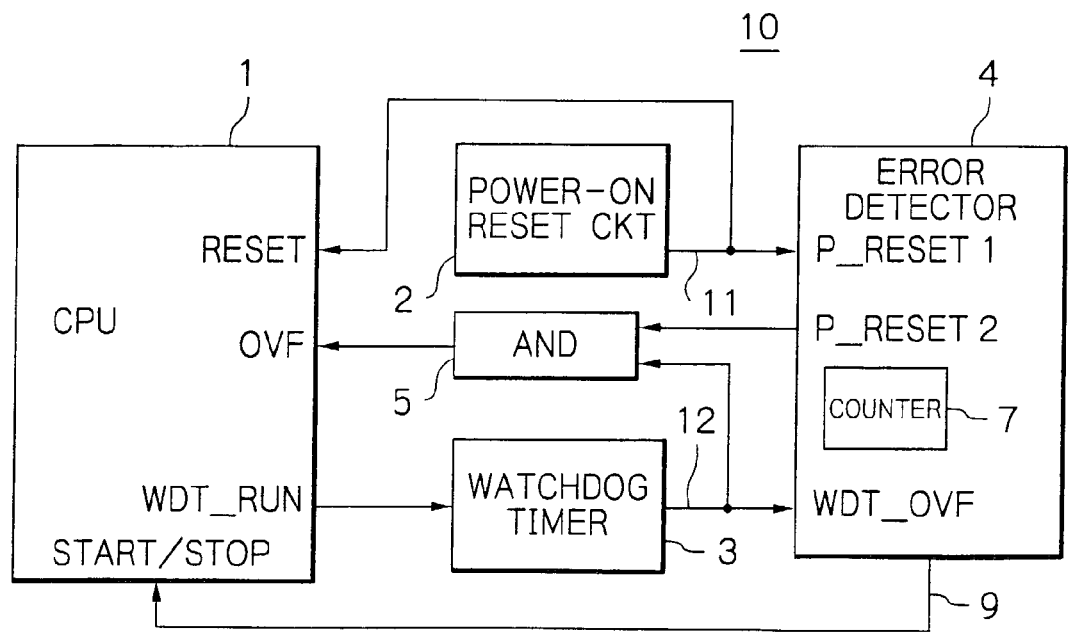
FIG. 2 is a schematic block diagram showing a preferred embodiment of the microcontroller including an error detector circuit in accordance with the present invention.

Referring to FIG. 2, a microcontroller in accordance with the present invention is generally designated by the reference numeral 10. Briefly, the microcontroller 10 of the illustrative embodiment is adapted such that particular interrupt vectors are fed to a CPU 1 in accordance with the output signals from a power-on reset circuit 2 and a watchdog timer 3. The CPU executes the interrupt vectors to determine whether an error has occurred in an error detector 4.

As shown in FIG. 2, the microcontroller 10 includes the CPU 1, the power-on reset circuit 2, the watchdog timer 3, the error detector 4, and an AND gate 5 interconnected as illustrated. The power-on reset circuit 2 is adapted to send out, upon powered on, a power-on reset signal P_RESET1 to a reset terminal RESET of the CPU 1 and a reset terminal P_RESET1 of the error detector 4. In response, the CPU 1 executes a first reset vector assigned to resetting to initialize itself. More specifically, the first reset vector is a fixed, interrupt vector effecting the initialization of the CPU 1. On receiving the power-on reset signal P_RESET1, the CPU 1 transfers the control to a predetermined address in order to execute a vector associated with the address.

The CPU 1 is adapted to intermittently send out a watchdog timer run signal WDT_RUN to the watchdog timer 3. The error detector 4 delivers a reset signal P_RESET2 to the AND gate 5 from its terminal P_RESET2 while the watchdog timer 3 delivers a watchdog timer overflow signal WDT_OVF to the AND gate 5. The AND gate 5 feeds the overflow terminal OVF of the CPU 1 with an overflow signal resultant from an AND of the input signals P_RESET2 and WDT_OVF.

After the power-up, the reset signal P_RESET2 output from the error detector 4 maintains its logical value ONE. More specifically, so long as the power-on reset circuit 2 operates normally, the error detector 4 feeds the value ONE to the AND gate 5 as the power reset signal P_RESET2. When some error occurs especially in a signal transmission pass of the error detector 4 associated with the power-on reset circuit 2, e.g. the reset signal P_RESET2 is fixed to its logical ZERO, the AND gate 5 allows the error to be easily located. That is, when the CPU does not receive an overflow signal at its overflow terminal OVF, the CPU 1 can determine in which of the watchdog timer 3, power reset circuit 2 and error detector 4 an error has occurred.

Further, the CPU 1 has its terminal START/STOP connected to an output 9 from the error detector 4. When the CPU 1 receives an operation start signal START at its terminal START/STOP from the error detector 4, the CPU 1 executes a second reset vector also assigned to resetting for initializing registers, not shown, included in the CPU 1 and then starts operating. The second reset vector is also a fixed interrupt vector effecting the initialization of the CPU 1 itself. For example, on receiving the operation start signal START, the CPU 1 transfers its control to a predetermined address and executes a fixed interrupt vector associated with the address.

The power-on reset circuit 2 is adapted for delivering, upon powered up, a power-on reset signal 11 to the CPU 1 and error detector 4. In response, the CPU 1 executes the previously mentioned, first reset vector to thereby initialize the microcontroller 10.

The watchdog timer 3 is adapted for receiving, after powered up, the watchdog timer run signal WDT_RUN from the terminal WDT_RUN of the CPU 1, to start timing a time interval having a preselected period of time T. The watchdog timer run signal WDT_RUN from the CPU 1 is a trigger signal for starting the watchdog timer 3. The error detector 4 includes a counter 7. The counter 7 is adapted to be reset in response to the power-on reset signal 11 to its initial state and count how many times many overflow signals 13 are received since the power-on reset signal was received. A count held in the counter 7 is compared with a preselected value, two in the embodiment, so as to enable the error detector 4 to determine how the overflow signals are provided from the watchdog timer 4.

Figure 3:
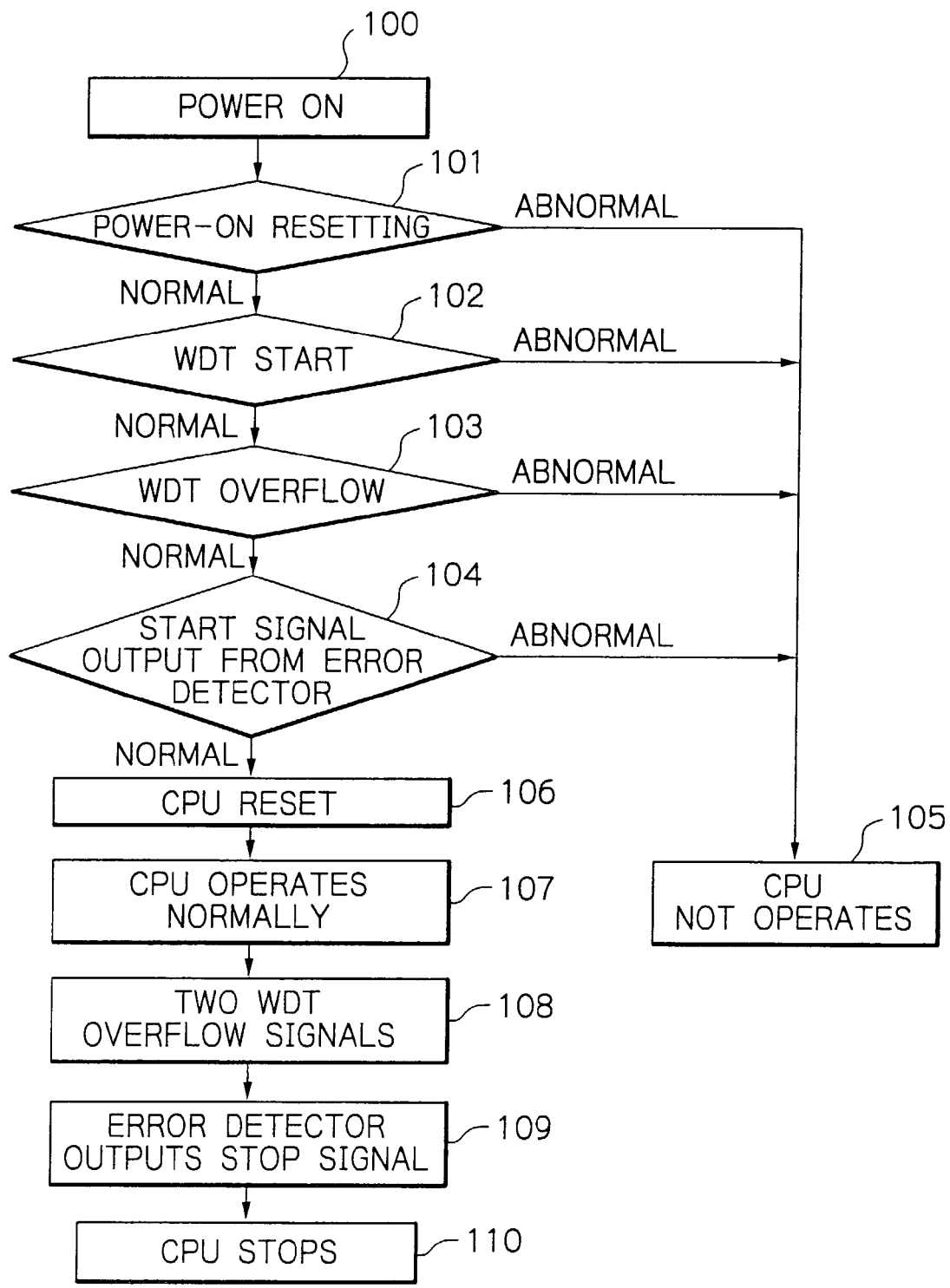
FIG. 3 is a flowchart demonstrating a specific operation of the illustrative embodiment.

Reference will also be made to FIG. 3 for describing a specific operation of the illustrative embodiment. As shown, after powered on (step 100), the power-on reset circuit 2 feeds a power-on reset signal 11 to the CPU 1 and error detector 4. In response, the CPU 1 executes the first interrupt vector to initialize the microcontroller 10 (step 101). That initialization is referred to as the first initialization phase in the present specification. Whenever an error has occurred in the power-on reset circuit 2, thus preventing the reset circuit 2 from outputting the power-on reset signal, the error detector 4 detects the error of the power-on reset circuit 2 and inhibits the CPU 1 from operating further (step 105). More specifically, the error detector 2 will not deliver the operation start signal 9 to the CPU 1.

After the CPU 1 has executed the first interrupt vector and initialized the microcontroller 10 in response to the power-on reset signal, the CPU 1 feeds the watchdog timer 3 with the watchdog timer run signal WDT_RUN to cause the watchdog timer 3 to start timing a preselected time interval T (step 102).

Figure 4:
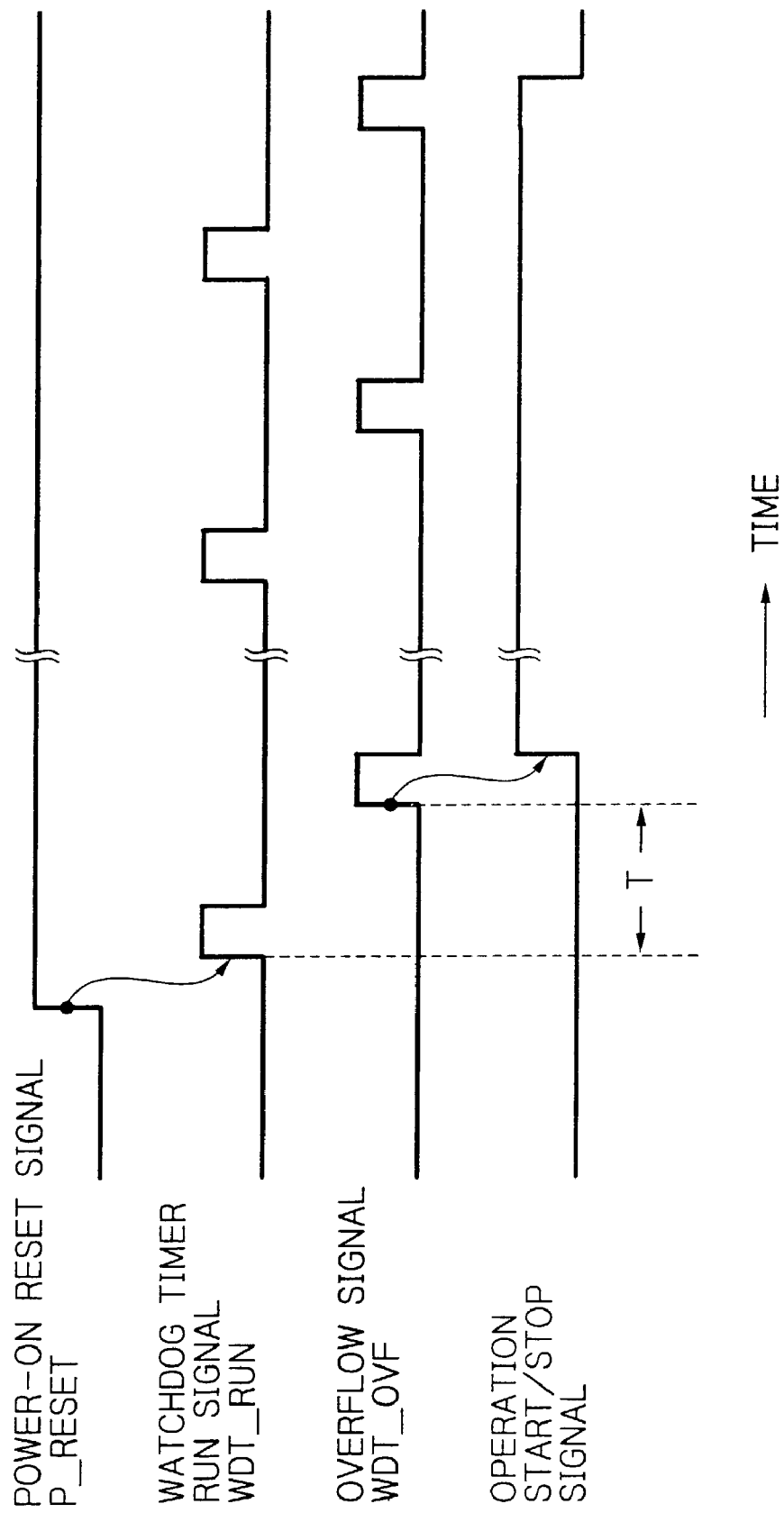
FIG. 4 is a timing chart useful for understanding an error detecting method available with the illustrative embodiment.

Referring to FIG. 4, a timing chart shows how an error is detected with the illustrative embodiment. The CPU 1 is adapted not to produce the watchdog timer run signal WDT_RUN to the watchdog timer 3 for the preselected period of time T after the watchdog timer 3 has started operating. While the watchdog timer 3 operates normally, the watchdog timer 3 produces a single overflow signal WDT_OVF to the error detector 4 upon the elapse of the period of time T (step 103).

More specifically, when an error has occurred in the watchdog timer 3, the watchdog timer 3 will develop no overflow signal WDT_OVF, or otherwise two or more overflow signals WDT_OVF to the error detector 4. If the watchdog timer 3 develops no overflow signal WDT_OVF, then the error detector 4 determines that the watchdog timer 3 operates erroneously. If the watchdog timer 3 produces two or more overflow signals WDT_OVF, then the error detector 4 also determines that the watchdog timer 3 operates erroneously since the count held in the counter 7 reaches the predetermined value, two with the illustrative embodiment. The error detector 4 will then prevent the CPU 1 from operating further (step 105). In this manner, the illustrative embodiment is adapted to cause the watchdog timer 3 to intentionally overflow in order to detect an error in the watchdog timer 3.

When the sole overflow signal 12 issues from the watchdog timer 3, the error detector 4 receives the signal 12 and determines that the overflow signal is the sole signal which has been output after the CPU 1 was initialized, i.e., the first interrupt vector was executed. The error detector 4 then delivers an operation start signal 9 to the CPU 1 (step 104).

Figure 5:
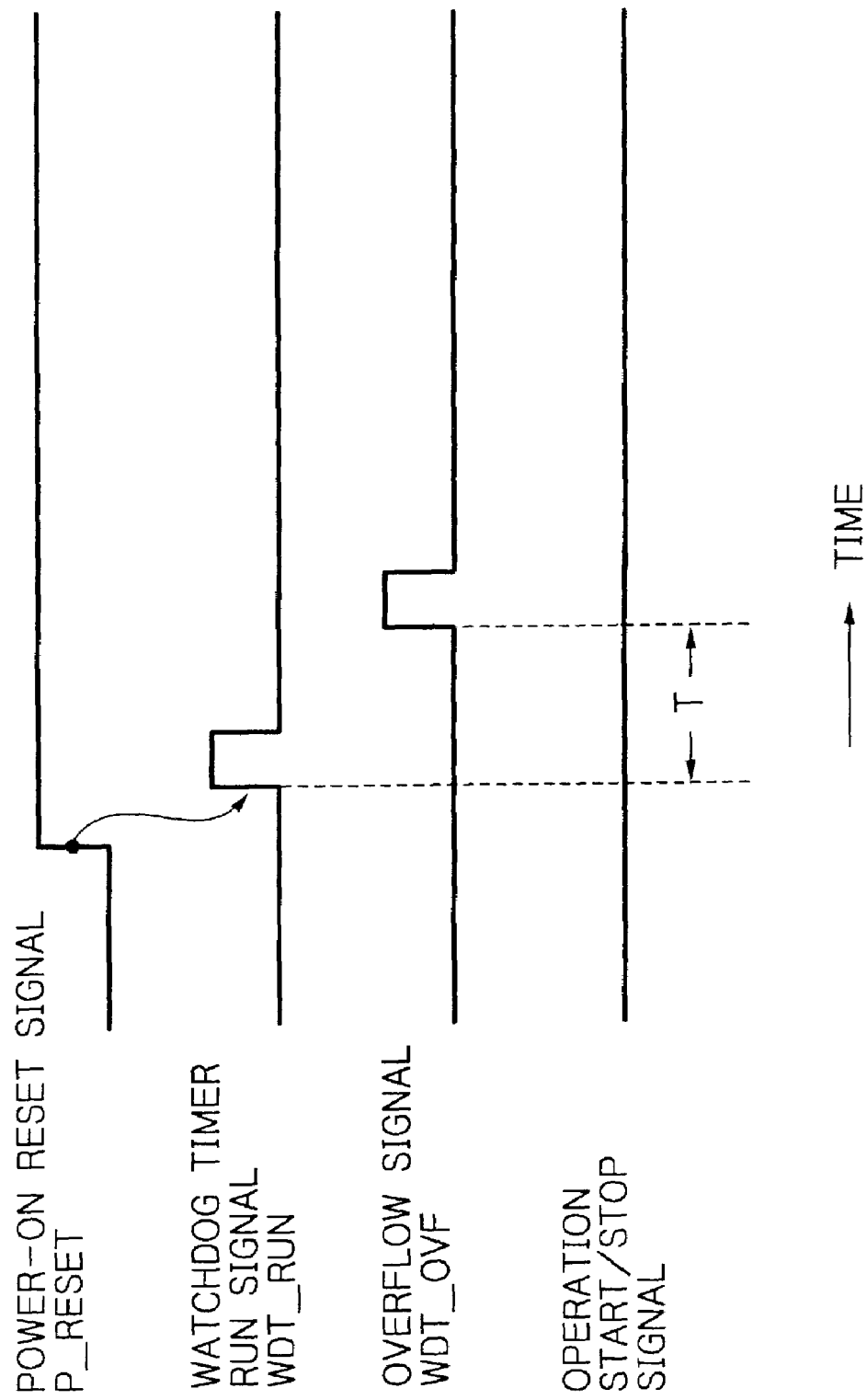
FIG. 5 is a timing chart demonstrating a condition in which an error occurs in the error detector of the illustrative embodiment.

How the illustrative embodiment operates when an error occurs in the error detector 4 per se will be described with reference to FIG. 5. As shown, if the CPU 1 does not receive the operation start signal 9 from the error detector 4, then the CPU 1 determines that the error detector 4 is erroneous, and will not operate (step 105). On the other hand, if the CPU 1 receives the operation start signal 9 from the error detector 4, then the CPU 1 executes the second interrupt vector and initializes its registers, not shown, (step 106). That initialization is referred to as the second initialization phase in the present specification. Subsequently, the CPU 1 executes program sequences and starts its usual operation until it receives an operation stop signal on the connection 9 from the error detector 4 (step 107).

If the CPU 1 crashes during usual operation, then the watchdog timer 3 feeds the error detector 4 with two watchdog timer overflow signals WDT-OVF in the embodiment (step 108). In response, the error detector 4 determines that the CPU 1 has failed, and sends out the operation stop signal 9 to the CPU 1 (step 109). On receiving the operation stop signal 9, the CPU 1 stops executing the program sequences (step 110).

As stated above, the illustrative embodiment selectively executes different routines in response to the power-on reset signal 11 output from the power-on reset circuit 2 and the overflow signal 12 intentionally output from the watchdog timer 3 on the elapse of the preselected period of time T. The illustrative embodiment can therefore detect the error of the error detector 4 itself with a simple program sequence and a simple circuit arrangement. It is therefore possible to further enhance the reliability of a system using the microcontroller 10.

Figure 6:
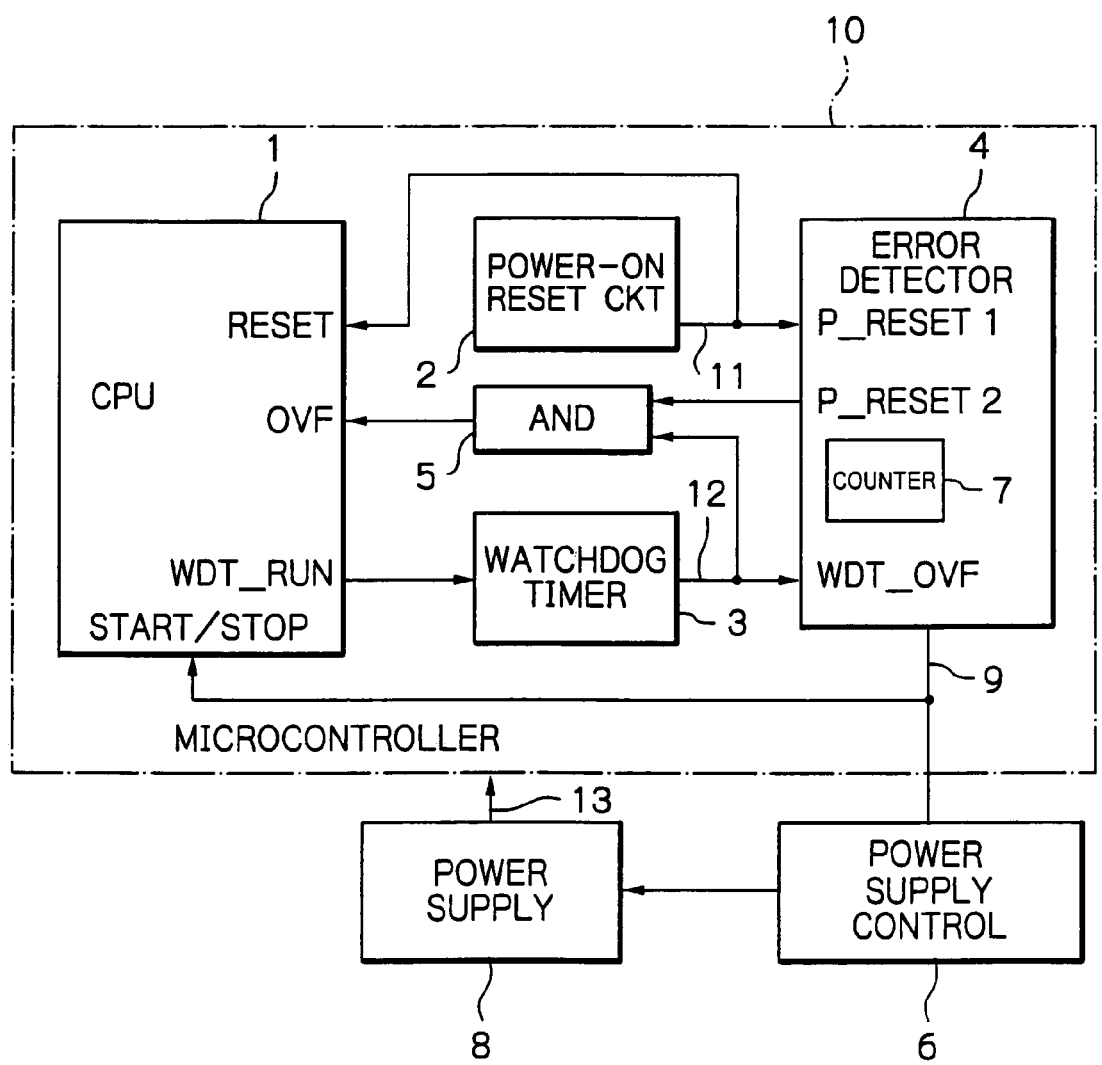
FIG. 6 is a schematic block diagram showing an alternative embodiment of the microcontroller in accordance with the present invention.

Reference will now be made to FIG. 6 for describing an alternative embodiment of the microcontroller in accordance with the present invention. As understood from the figure, the alternative embodiment is identical with the previously described embodiment except that it additionally includes a power supply control 6. The microcontroller 10 is supplied with electric power 13 from a power supply unit 8. This is also the case with the embodiment described with reference to FIG. 2 although not specifically described. The power supply control 6 is adapted to control the power supply unit 8 as to whether or not the power 13 is to be supplied to the microcontroller 10. That will be described in detail. In FIGS. 2 and 6, like structural elements are designated by identical reference numerals, and a detailed description thereof will not be made again in order to avoid redundancy.

In the illustrative embodiment, the power supply control 6 is adapted to receive the stop signal 9, when the error detector 4 detects an error, to stop feeding the electric power 13 to the microcontroller 10. The stop signal 9 is also sent to the CPU 1 as described above. In respect of the remaining points, the illustrative embodiment operates to detect an error in exactly the same manner as the previous embodiment.

The power supply controller 6 may be positioned outside of an LSI (Large Scale Integrated circuit) constituting the microcontroller 10. the power supply controller 6 is adapted to cause the power supply unit 8 to stop feeding the supply voltage 13 to the microcomputer 10 in response to the stop signal 9 fed from the error detector 4.

The operation of the illustrative embodiment will be described more specifically hereinafter. The power supply controller 6 feeds the supply voltage 13 to the microcontroller 10. After powered up, the first initialization phase is executed in response to the reset signal 11 output from the power-on reset circuit 2. Subsequently, the second initialization phase is executed in response to the start signal output 9 from the error detector 4, which is based on the first overflow signal 12 output from the watchdog timer 3. Thereafter, the CPU 1 starts performing the usual operation. The procedure described so far is identical with the procedure described in relation to the embodiment shown in FIG. 2.

When the CPU 1 becomes out of control during usual operation, the watchdog timer 3 feeds two watchdog timer overflow signals WDT_OVF to the error detector 4. In response, the error detector 4 determines an error occurring and sends out the operation stop signal 9 to both of the CPU 1 and power supply controller 6. By the operation stop signal 9, the power supply controller 6 is informed of the error having occurred in the microcontroller 10 and will cause the power supply unit 8 to stop feeding the microcontroller 10 with the supply voltage 13.

As stated above, the error detector 4 causes the power supply controller 6 to stop feeding the power supply 13 to the microcontroller 10 when the microcontroller 10 fails. Therefore, the illustrative embodiment also enhances the reliability of a microcontroller system while achieving the same advantage as the previous embodiment.

While the illustrative embodiments are described as having the structural parts thereof mounted on a single semiconductor chip, such a configuration is only illustrative. For example, the CPU 1, error detector 4, watchdog timer 3 and AND gate 5 may be mounted on one chip, in which case the power-on reset circuit 2 will be mounted on another chip. Also, the CPU 1 may be mounted on one chip alone, in which case the remaining structural parts will be mounted on an separate chip. Further, even the individual structural parts may be mounted on respective chips.

In summary, it has been seen that the present invention provides a microcontroller capable of detecting the errors of its structural parts, particularly the error of an error detecting circuit itself, with simple program sequences and a simple circuit arrangement. The microcontroller therefore further enhances the reliability of a system using it.

The entire disclosure of Japanese patent application No. 2002-46748 filed on Feb. 22, 2002, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What I claim is:

1. A microcontroller comprising:
    a power-on reset circuit for issuing a power-on reset signal in response to said microcontroller being powered on;
    a CPU (Central Processor Unit) for executing a first initialization phase in response to the power-on reset signal, a second initialization phase in response to a start signal, and usual processing following the second initialization phase, said CPU outputting a timer run signal once in the first initialization phase and repeatedly outputting the timer run signals during the usual processing;
    a watchdog timer for starting timing in response to the timer run signal and outputting a first overflow signal upon a preselected period of time elapsing from starting the timing;
    an error detector operative in response to the power-on reset signal and the first overflow signal following the power-on reset signal for feeding said CPU with the start signal, the error detector passing the power-on reset signal therethrough, the error detector causing said CPU to stop the usual processing upon receiving the first overflow signal a plurality of times; and
    a decision circuit, operative in response to the first overflow signal and the power-on reset signal passing through the error detector, for feeding a second overflow signal to the CPU,
    whereby an error can be discriminated between said power-on reset circuit, CPU, watchdog timer, and error detector.

2. The microcontroller in accordance with claim 1, wherein after feeding said CPU with the start signal, said error detector feeds said CPU with a stop signal upon receiving the first overflow signals a preselected number of times, thereby causing said CPU to stop the usual processing.

3. A microcontroller in accordance with claim 2, wherein the preselected number of times is two.

4. The microcontroller in accordance with claim 1,
wherein said error detector passes the power-on reset signal therethrough,
wherein said microcontroller further comprises a decision circuit operative in response to the first overflow signal and the power-on reset signal passing said error detector for feeding said CPU with a second overflow s signal, and
wherein said CPU stops the usual processing when said CPU does not receive the second overflow signal.

5. Error detecting circuitry for use with a microcontroller for detecting an error of a structural part included in the microcontroller, comprising:
a power-on reset circuit for issuing a power-on reset signal in response to the microcontroller being powered on;
a CPU (Central Processor Unit) included in the microcontroller for executing a first initialization phase in response to the power-on reset signal, a second initialization phase in response to a start signal, and usual processing following the second initialization phase, said CPU outputting a timer run signal once in the first initialization phase and repeatedly outputting the timer run signals during the usual processing;
a watchdog timer for starting timing in response to the timer run signal and outputting a first overflow signal upon a preselected period of time elapsing from starting the timing;
an error detector operative in response to the power-on reset signal and the first overflow signal following the power-on reset signal for feeding said CPU with the start signal, the error detector passing the power-on reset signal therethrough; and
a decision circuit, operative in response to the first overflow signal and to the power-on reset signal after the power-on reset signal has passed said error detector, for feeding a second overflow signal to said CPU,
wherein said error detector, after feeding said CPU with the start signal, feeds a stop signal to said CPU upon receiving the first overflow signals a preselected plural number of times, thereby causing said CPU to stop the usual processing, and
wherein said circuitry further comprises a power supply controller operative in response to the stop signal for stopping electric power from being fed to the microcontroller.

6. The circuitry in accordance with claim 5,
wherein said error detector passes the power-on reset signal therethrough,
wherein said circuitry further comprises a decision circuit, operative in response to the first overflow signal and the power-on reset signal passing said error detector, for feeding said CPU with a second overflow signal; and
wherein said CPU stops the usual processing when said CPU does not receive the second overflow signal.

7. The circuitry in accordance with claim 5, wherein the preselected number of times is two.

8. A method of detecting an error of a structural part included in a microcontroller including a CPU (Central Processor Unit), comprising the steps of:
powering on the microcontroller;
generating a power-on reset signal;
executing in the CPU a first initialization phase in response to the power-on reset signal;
generating a single timer run signal by the CPU;
starting timing in response to the single timer run signal;
generating a first overflow signal upon a preselected period of time elapsing from starting the timing;
feeding the CPU with a start signal in response to the first overflow signal;
executing in the CPU a second initialization phase in response to the start signal;
executing usual processing in the CPU;
feeding a second overflow signal to the CPU in response to the first overflow signal and the power-on reset signal; and
stopping the usual processing in response to the first overflow signals in plural.

9. The method in accordance with claim 8, further comprising the steps of:
feeding the CPU with a stop signal when the first overflow signals are generated a preselected number of times after the CPU is fed with the start signal; and
stopping the usual processing in the CPU in response to the stop signal.

10. The method in accordance with claim 9, wherein the preselected number of times is two.

11. The method in accordance with claim 8, further
routing the power-on reset signal through an error detector for executing said step of feeding the CPU with the start signal;
feeding the CPU with a second overflow signal in response to the first overflow signal and the power-on reset signal routed through the error detector; and
stopping the usual processing in the CPU when the CPU is not fed with the second overflow signal.

12. The method in accordance with claim 8, further comprising the step of stopping the feeding of the microcontroller with electric power in response to the stop signal.

* * * * *